(12) United States Patent
Kaulartz et al.

(10) Patent No.: US 8,942,372 B2
(45) Date of Patent: Jan. 27, 2015

(54) METHOD AND DEVICE FOR IDENTIFYING OBJECTS

(75) Inventors: Markus Kaulartz, Munich (DE); Oliver Reiser, Regensburg (DE); Michael Zich, Poxdorf (DE); Simon Bauer, Bayreuth (DE); Daniel Kobsdaj, Poxdorf (DE)

(73) Assignee: SecureCode Ltd, Baiersdorf (DE)

( * ) Notice: Subject to any disclaimer, the term of this patent is extended or adjusted under 35 U.S.C. 154(b) by 686 days.

(21) Appl. No.: 12/993,812

(22) PCT Filed: May 19, 2009

(86) PCT No.: PCT/EP2009/056101
§ 371 (c)(1),
(2), (4) Date: May 23, 2011

(87) PCT Pub. No.: WO2009/141363
PCT Pub. Date: Nov. 26, 2009

(65) Prior Publication Data
US 2011/0219228 A1 Sep. 8, 2011

(30) Foreign Application Priority Data
May 20, 2008 (DE) .......................... 10 2008 001 880

(51) Int. Cl.
*H04K 1/00* (2006.01)
*H04L 9/00* (2006.01)
(Continued)

(52) U.S. Cl.
CPC ............ *G06Q 10/0833* (2013.01); *G06F 21/10* (2013.01); *G06K 9/18* (2013.01);
(Continued)

(58) Field of Classification Search
CPC . G06K 9/18; G06K 19/06; G06K 2017/0064; G11B 20/00253; G11B 20/0026; G11B 20/00268; G11B 20/00275; G11B 20/00347; G11B 20/00355; G11B 20/00384; G06F 21/10
USPC ............ 713/189; 705/50, 317, 318; 700/213, 700/215, 219–225; 235/375; 380/28, 55
See application file for complete search history.

(56) References Cited

U.S. PATENT DOCUMENTS 6,226,619 B1 * 5/2001 Halperin et al. ................. 705/23
(Continued)

FOREIGN PATENT DOCUMENTS

DE 10019721 3/2001
(Continued)

OTHER PUBLICATIONS

PCT Search Report corresponding to the PCT Application No. EP2009/056101 dated Sep. 16, 2009.

*Primary Examiner* — Ashok Patel
*Assistant Examiner* — Daniel Potratz
(74) *Attorney, Agent, or Firm* — DLA Piper LLP (US)

(57) ABSTRACT

The invention relates to a method for identifying an object comprising at least one object identifier with an object code that is used to verify the authenticity of the object. The method comprises the following steps: creation of a unique random system code consisting of a first and a second system code, the first part of the system code being generated from a first character set by a first random method and the second part of the system code being generated from a second character set by a second random method and saving of the system code together with at least one first object-specific information in a first data memory, the first part of the system code being encrypted by a first encryption method and the second part of the system code by a second encryption method prior to being saved; creation of a random encryption key from a third character set by a third random method, creation of a unique assignment identifier by an assignment method and saving of the encryption key, assignment identifier and at least one second object-specific piece of information in a second data memory; creation of the object code, consisting of the first part of the system code and the assignment key, encryption of the object identifier by a fourth encryption method and saving of the encrypted system code together with the encrypted object identifier in a third data memory; and attachment of the object code to the object.

25 Claims, 8 Drawing Sheets

(51) Int. Cl.
*H04L 9/28* (2006.01)
*G06Q 10/08* (2012.01)
*G06F 21/10* (2013.01)
*G06F 21/00* (2013.01)
*G06F 17/00* (2006.01)
*G06F 11/30* (2006.01)
*G06F 12/14* (2006.01)
*G06K 9/18* (2006.01)
*G11B 20/00* (2006.01)
*G06K 17/00* (2006.01)

(52) U.S. Cl.
CPC .. *G11B 20/00347* (2013.01); *G06K 2017/0064* (2013.01)
USPC .............. 380/28; 705/50; 700/215; 235/375; 713/189; 380/55

(56) References Cited

U.S. PATENT DOCUMENTS

| | | | |
|---|---|---|---|
| 7,614,546 B2* | 11/2009 | Grant et al. | 235/375 |
| 7,823,768 B2* | 11/2010 | Self et al. | 235/375 |
| 7,913,093 B2* | 3/2011 | Ishigaki et al. | 713/189 |
| 8,103,592 B2* | 1/2012 | Lilikov et al. | 705/59 |
| 2006/0053025 A1 | 3/2006 | Mertens | |

FOREIGN PATENT DOCUMENTS

| | | |
|---|---|---|
| DE | 10137695 | 2/2003 |
| DE | 10137695 | 2/2003 |
| DE | 10328328 | 1/2005 |
| EP | 0 889 448 A | 1/1999 |
| JP | 4341880 A1 | 12/1993 |
| WO | 80/02757 | 12/1980 |
| WO | 02/095661 | 11/2002 |
| WO | 2007/040552 | 4/2007 |

* cited by examiner

Object Code = F37E4A1BD8AU

METHOD AND DEVICE FOR IDENTIFYING OBJECTS

This patent application claims priority under 35 USC 120 and 119 to and is a national stage filing of PCT/EP2009/056101 filed on May 19, 2009. This patent application also claims priority under 35 USC 119 to German Patent Application Serial No. 102008001880.5 filed on May 20, 2008, the entirety of both of which are incorporated herein by reference.

The present invention relates to a method and a device for identifying objects and for the verification of the authenticity of the labeled objects and particularly for a counterfeit-proof labeling of drugs and/or medicines as well as for the verification of the identification by a consumer.

Various methods have been developed for the labeling of goods, such as medicines, garments, sound carriers or the like, in order to give manufacturers, dealers, customs authorities, consumers etc. the possibility of verifying the authenticity of the goods. These methods are supposed to enable consumers, for example, to verify the authenticity of the acquired goods, in order to thus protect themselves from counterfeit products, particularly from counterfeit drugs and/or medicines, which possibly do not have the desired effects or even have harmful effects.

DE 43 41 880 A1 describes a control system for objects with data carriers, on which data can be stored as an identification code, and with external equipment for data acquisition and for computer-aided data processing, which can be used for protection from prohibited imitation and recreation of articles. The control system checks manufacturer-specific data, which is stored as an identification code on the data carrier, such as on a RFID chip. The data carrier is attached to the article to be protected. Such known RFID chips are, however, not counterfeit-proof, since a counterfeit or recreation of similar data carriers as well as a reprogramming or destruction of the data carrier are possible by known methods. The possibility of manipulating the data carriers limits the reliability of a corresponding control system considerably. Furthermore a special device, with which the data carrier is read, is required for the verification of the authenticity of the identification code. This equipment is normally not available, especially to the consumer, because of the diversity of the different data carriers and objects, so that a simple and accurate verification of items is not available especially to the consumer.

EP 0 889 448 B1 describes a method in which the objects are provided with a label, on which a non-reproducible pattern is placed. The non-reproducible pattern is produced from the description of the object. In this method, the verification of the label is carried out by sensing with a special device. However, such devices are not available on-site to the consumers and the verification of the labels is therefore not available especially for consumers. Furthermore, such special devices for verification are not easy to operate, so that there are unavoidable errors in verification by inexperienced persons, like the consumer, which further affects the reliability of the concerned method.

The object of the invention therefore is to propose a method and a device for identification of objects and for verifying the authenticity of appropriately labeled objects, which are very accurate and easy to use.

The object of the invention is solved by a method for identifying an object, which has at least one object identifier, with an object code, which is used for the verification of the authenticity of the object, and which has these steps: generating of a unique random system code, consisting of a first and a second part of the system code, the first part of the system code being generated from a first character set by a first random method and the second part of the system code from a second character set by a second random method, and storing the system code together with at least one first object-specific information in a first data memory, whereby the first part of the system code is encrypted by a first encryption method and the second part of the system code by a second encryption method prior to being saved; generating of a random encryption key from a third character set by a third random method, generating of a unique assignment identifier by an assignment method and storing of the encryption key, the assignment identifier and at least one second object-specific information in a second data memory; generating of the object code, consisting at least of the first part of the system code and the assignment identifier, encrypting of the system code by a third encryption method, encrypting of the object identifier by a fourth encryption method and storing the encrypted system code together with the encrypted object identifier in a third data memory; and attachment of the object code to the object.

One aspect of the invention on hand proposes that the method includes the feature whereby an activation information is stored in the first data memory in addition to the stored system code, which indicates whether the system code is active or non-active, whereby the system code can be checked only after an activation. The security of the identification of the object is further improved advantageously by this, since the identification of the object is activated only before the sale of the object to the consumer and thus an unsafe supply chain from the producer to the consumer is bridged.

Another aspect of the invention on hand proposes that the object code is divided into a first and a second object code. It is further proposed that the second part of the object code is attached to the object in such a manner that it is not accessible from outside and the first part of the object code is attached to the object on the outside. It is further proposed that the first part of the object code is attached under a visual protection. Through this, the security and reliability of the identification of the object can be advantageously increased further.

Furthermore, the invention on hand proposes a method for verifying the authenticity of an object with an object code, which has at least one object identifier which is labeled by one of the proposed methods for identifying objects as per the invention on hand. The method has the following steps: transferring the object code through a transmission medium and receipt of the transferred object code by the verification device, dividing of the object code into at least a first part of the system code and an assignment identifier, encrypting of the first part of the system code by a first encryption method, comparing of the encrypted first part of the system code with the first parts of the system codes which are stored in the first data memory and, if the encrypted first part of the system code is found in the first data memory, decoding the second part of the system code stored in the first data memory by the second encryption method, combining the first and the second part of the system codes together to form a system code, comparing of the assignment identifier with assignment identifiers which are stored in the second data memory and, if a matching assignment identifier is found, encrypting of the system code by a third encryption method, comparing of the encrypted system code with encrypted system codes stored in the third data memory and, if a matching encrypted system code is found, decoding an assigned encrypted object identifier by a fourth encryption method and display of a decoded object identifier for comparing the displayed object identifier with the object identifier on the object. The method therefore permits a particularly simple and reliable verification of the identification.

Another aspect of the aforementioned method proposes that the method, in which the system code is stored in the first data memory with an additional activation information, displays whether the system code is active or non-active, and has a step in which the activation information is activated by one of the system codes. This aspect of the method is particularly useful in closing the unsafe supply chain between producers and consumers.

As per further aspects of the invention, the transmission medium is the Internet or a cell phone network. Over and above that, retrieval-specific data, which is generated during the verification of the object code, is stored in a fourth data memory. It is proposed for practical purposes that, depending on the transmission medium, the retrieval-specific data contains, on entry of the code via the Internet, at least the time, the IP-address, the Internet service provider and the number of entry attempts and, on entry of the code via SMS, at least the time, the cell phone number and the SMS selection number. This is advantageous, since the proposed transmission medium is widespread and is thus accessible for almost every consumer. Furthermore the storing of retrieval-specific data is advantageous in order to verify, for example, when, how and through whom an object code was verified for the first time.

The invention on hand further proposes a device for labeling an object with an object code and a device for verifying an object code of an object, whereby the devices have facilities configured to execute the steps of the method of the invention on hand. Furthermore, the invention on hand proposes a computer program which, when run on a computer, makes it execute the method according to the invention on hand, as well as a data carrier on which the computer program is stored.

Another aspect of the invention on hand proposes an object which is identified with an object code, which was produced by the method according to the invention.

Preferred implementation forms of the invention are explained below, purely as an example and without any restriction, with the aid of the attached drawings, in which.

Figure 6:
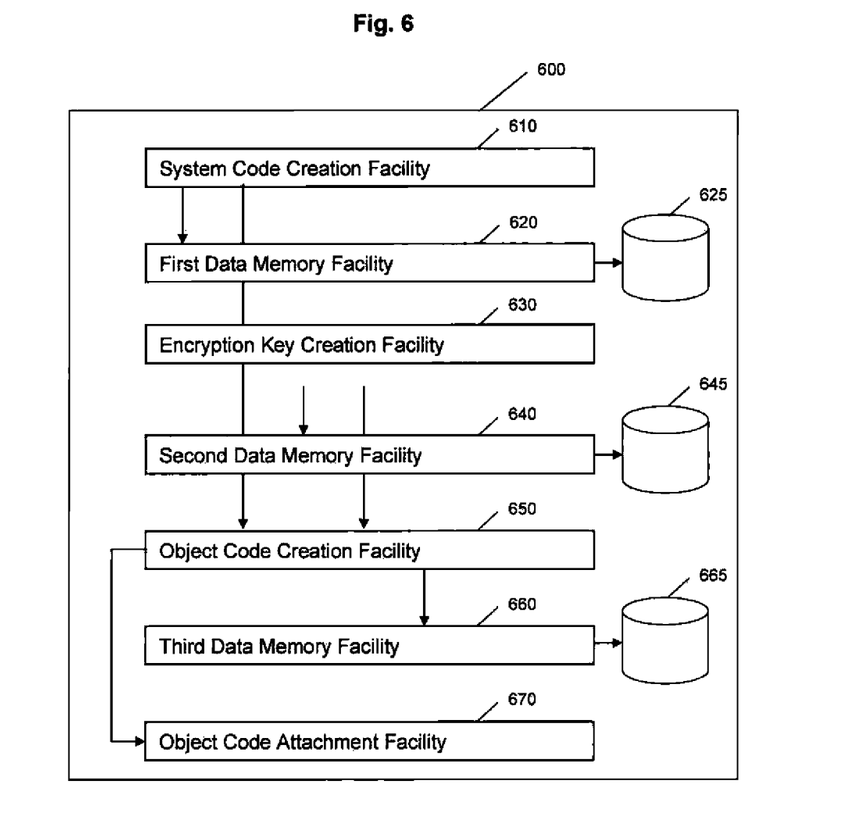
FIG. 6 shows a schematic representation of an implementation form of the device for labeling of objects.

An implementation example of a device for labeling an object is shown in FIG. 6. The device 600 comprises a System Code Generation Facility 610, which creates a unique random system code and transfers it to a First Data Memory Facility 620 for storage in a data memory 625; an Encryption Key Generation Facility 630, which creates a random encryption key and transfers it to a Second Data Memory Facility 640 for storage in a data memory 645; an Object Code Generation Facility 650, which creates an object code and transfers it to a Third Data Memory Facility 660 for storage in a data memory 665; and an Object Code Attachment Facility 670, which attaches the object code created by the Object Code Generation Facility 650 to an object. Furthermore, the system code created by the System Code Generation Facility 610 and the encryption key created by the Encryption Key Generation Facility 630 are transferred to the Object Code Generation Facility 650.

The Data Memory Facilities 620, 640 and 660 and the data memories 625, 645 and 665 are preferably implemented physically separated for improving the security; in a simplified implementation example, the data memories 625, 645 and 665 are integrated also into the corresponding Data Memory Facilities 620, 640 and 660. Furthermore the data memories 625, 645 and 665 are preferably implemented as physically separate data memories, in order to ensure a maximum amount of security. The data memories 625, 645 and 665 are combined in one data memory in an implementation example for the simplification of the device 600. It is self-evident to the expert that two of the data memories each can also be combined into one data memory and an additional separate data memory for the third data memory is considered as part of the invention.

Figure 1:
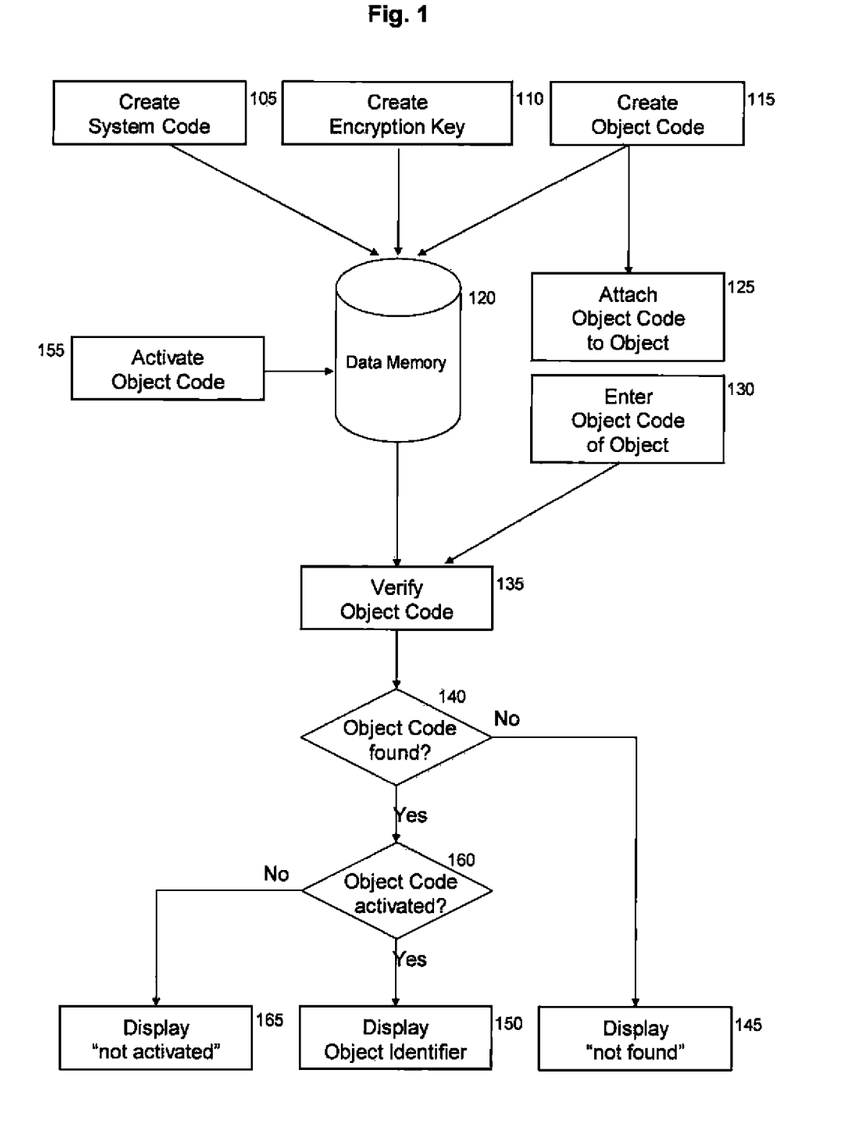
FIG. 1 is a flowchart of an implementation form of the method according to the invention.
Figure 2:
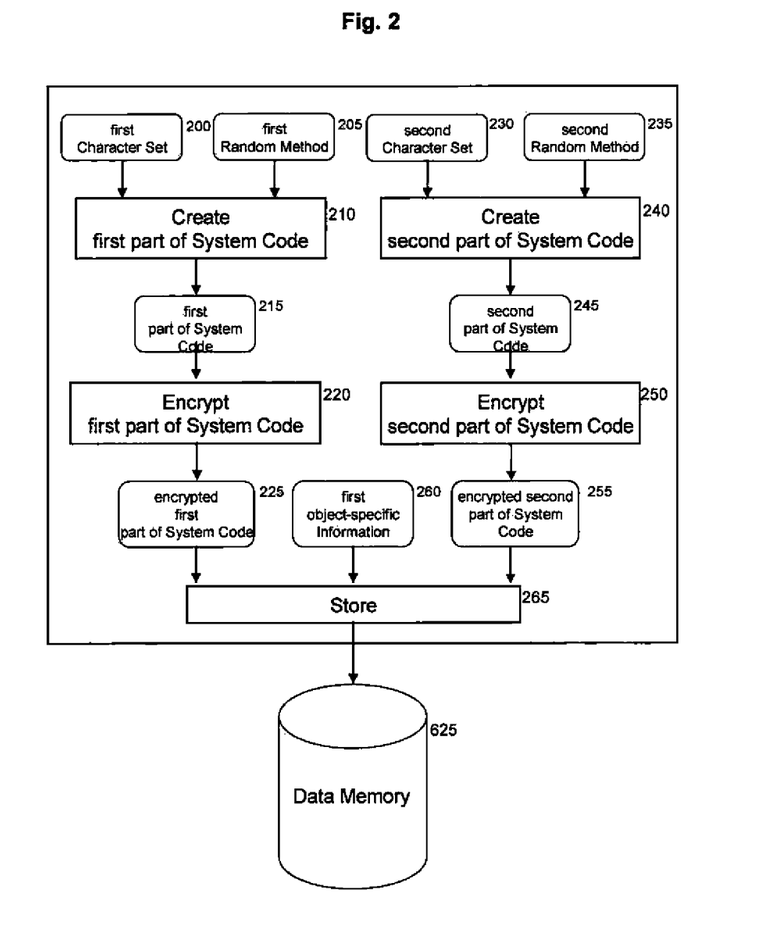
FIG. 2 is a detailed flowchart for the generation of the system code of an implementation example of the implementation form as per FIG. 1.
Figure 3:
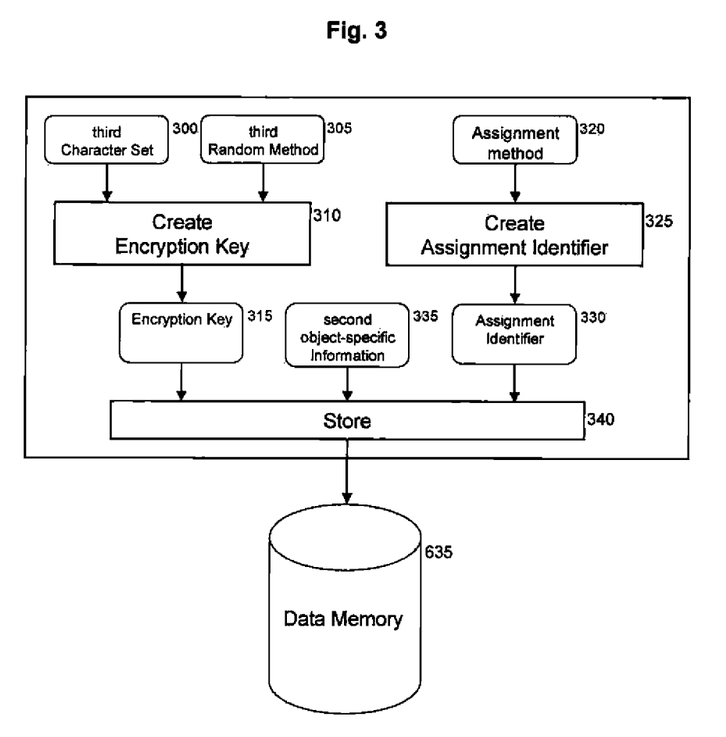
FIG. 3 shows a detailed flowchart for the generation of the encryption keys according to an implementation example of the implementation form as per FIG. 1.
Figure 4:
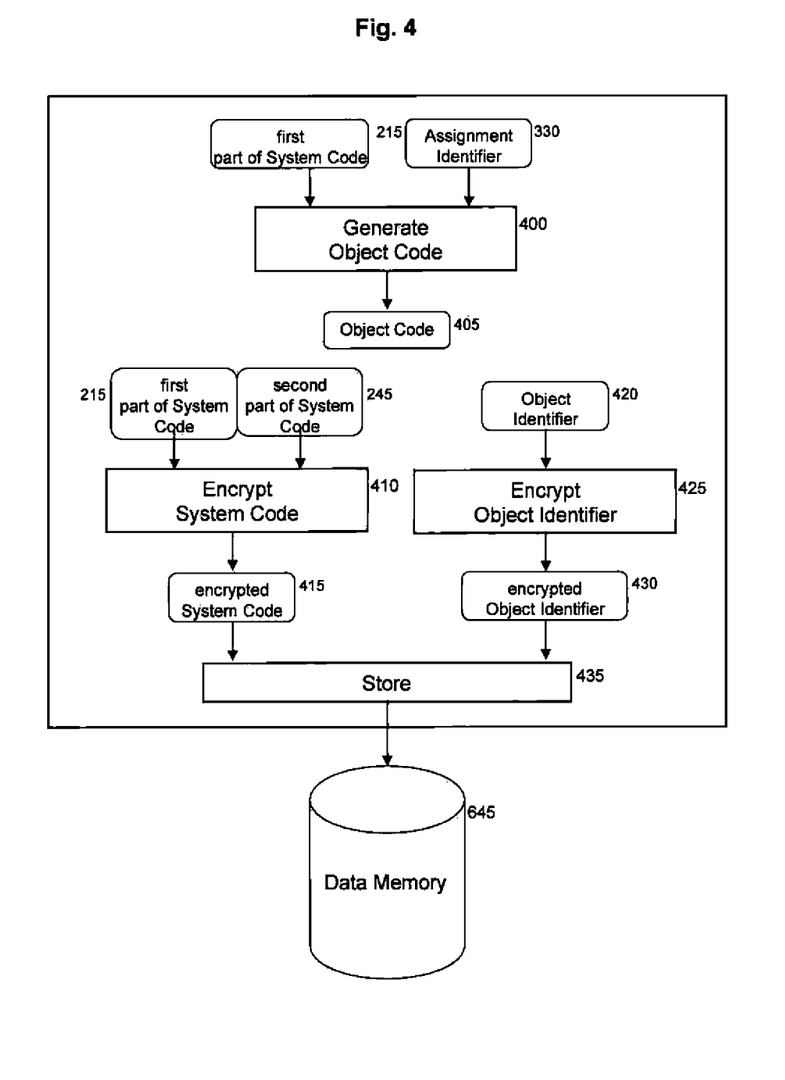
FIG. 4 shows a detailed flowchart for the generation of the object code according to an implementation example of the implementation form as per FIG. 1.

In the implementation example of a method as per FIG. 1, the system code is created in step 105, the encryption keys in step 110 and the object code in step 115. The implementation examples in FIGS. 2, 3 and 4 show respectively the generation of the individual codes or keys in detail. As a simplification, the data memories 625, 645 and 665 are shown as one data memory 120 in FIG. 1.

The generation of the system code is shown in detail in FIG. 2. As an example, the generation of a system code with a length of 128 characters is described here, in which the system code is formed from a first part of the system code 215, which contains the first ten characters of the system code, and a second part of the system code 245, which contains the other 118 characters of the system code. It is self-evident for the expert that other arbitrary character lengths, such as 64, 256, 512 characters, can be used in a suitable way for the system code and for the respective system code parts 215, 245. The first part of the system code 215 with a length of ten characters is created by the System Code Generation Facility 610 from a first character set 200 by using the first random method 205. The first character set 200 contains, for example, a number of characters which are selected from a complete character set, which is available to the method or to the device. In the implementation form described here, the complete character set contains the capital letters A to Z and the numbers 0 to 9 but no special characters. The first character set 200 is reduced in this implementation example by characters and numbers, such as Z and 2, in order to ensure the unambiguity of the first part of the system code 215. The first random method 205 is an arbitrary state of the art method, in which a number of characters are selected randomly, i.e. not predictably, from a predefined character set. As an example, the string "F37E4A1BD8" is generated here as the first part of the system code 215 by the System Code Generation Facility 610. This first part of the system code 215 is encrypted in step

220 by using a state of the art encryption method into an encrypted first part of the system code 225. In this implementation example preferably a cryptographic hash function, such as the Message Digest Algorithm 5 (in short: MD5) or the Secure Hash Algorithm (in short: SHA) is used as encryption method.

Furthermore, in step 240 the System Code Generation Facility 610 creates a second part of the system code 245 from a second character set 230 by means of a second random method 235. The second character set 230 contains preferably the complete character set described above. The second random method 235 is also an arbitrary random method with the same features as already described above, the second random method 235 is preferably identical with the first random method 205. The second part of the system code 245 created in this manner with a length of 118 characters is encrypted by the second encryption method in step 250. In this implementation example a symmetrical encryption method, such as, for example, the Advanced Encryption Standard (in short: AES) or the Data Encryption Standard (in short: DES), is preferably used, which uses the first part of the system code 215 as key for the encryption. The result of step 250 is an encrypted second part of the system code 255.

The encrypted first part of the system code 225 and the encrypted second part of the system code 255 together with a first object-specific information 260 are stored in step 265 by the First Data Memory Facility 620 in the data memory 625 in such a manner, that the encrypted first part of the system code 225, the encrypted second part of the system code 255 and the first object-specific information 260 are assigned to each other. In this implementation example, the first object-specific information 260 preferably includes a production unit number, which identifies a number of objects from a production, and the current date.

The first part of the system code 215 and the second part of the system code 245 form the system code when both parts of the system codes are combined with each other. As per the implementation form shown in FIG. 2, the system code is not formed such that it is available for use in further steps of the method, rather the system code is formed afresh for the individual step in which it is needed, by combination of the first part of the system code 215 with the second part of the system code 245 in this single step. The combination is a concatenation of the first and the second parts of the system code to a system code of corresponding length. It is self-evident for the expert that the system code can be provided as such by a corresponding additional step for use in further methods.

Furthermore, in an implementation example an activation information, not shown in FIG. 2, is additionally saved by the Data Memory Facility 620 in the data memory 120, which assigned to an encrypted first part of the system code 215 indicates whether this is locked or free. In order to be able to verify the object code, this activation information must be activated before verification of an object code by an activation step, which is described in more detail below.

In another step 110, the method in FIG. 1 produces an encryption key 315 and an assignment identifier 330. The generation of the encryption key 315 and the assignment identifier 330 is shown in detail in FIG. 3 according to an implementation example. The encryption key 315 is created in step 310 by the Encryption Key Generation Facility 630 by using a third random method 305 from a third character set 300. The third character set 300 contains, for example, the complete character set described above and in addition also all lower case letters and special characters. The third random method 305 is for practical purposes identical with the first random method 205 and the second random method 235, whereby other known random methods may also be used. The encryption key 315 has preferably a character length between 200 and 500 characters and is variable, i.e. the character length changes in predetermined intervals. The encryption key has a length of 256 characters in the implementation example preferred here.

Furthermore, in step 325 an assignment identifier 330 is created by using a fixed assignment method 320. A preferred assignment method 320 calculates, for example, the number of days between a reference date and the encryption day, and gives this out as the assignment identifier 330. Furthermore, an encryption of the assignment identifier 330 is possible by the assignment method 320. In the implementation example preferred here, the assignment identifier 330 is encrypted by using a simple encoding method, in which every individual character is coded. For example, if there are 121 days between the reference date and the encryption day, the number of days is first divided by the assignment method 320 into two parts, such as 1 as the first part and 21 as a second part. After that the first and the second part are converted by using a transformation formula, such as 1=A, 2=B, 3=C, . . . , 21=U, . . . , 26=Z, 27=A, . . . , 52=Z, 53=A etc., to give the letters "A" for the first part and "U" for the second part, whereby by concatenating the first and second part the combination of letters "AU" results as assignment identifier 330.

In step 340, the encryption key 315 and the assignment identifier 330 together with a second object-specific information 335 are stored by the Second Data Memory Facility 640 in the data memory 120. The second object-specific information 335 comprises preferably the production unit number and the current date.

The generation of the object code 405 is carried out in step 115 in FIG. 1, which is shown in detail according to an implementation example in FIG. 4. An object code 405, which consists of at least the first part of the system code 215 and the assignment identifier 330, is created in step 400 by the Object Code Generation Facility 650. The first part of the system code 215 and the assignment identifier 330 are preferably combined together, whereby in the example described here the object code 405 "F37E4A1BD8AU" with 12 characters results from the first part of the system code 215 with ten characters and the assignment identifier 330 with two characters, described above.

Furthermore, the system code, which consists of the first part of the system code 215 and the second part of the system code 245, is encrypted by the Object Code Generation Facility 650 in step 410 by a third encryption method to give an encrypted system code 415. The third encryption method is a state of the art encryption method, preferably an asymmetrical encryption method, such as the RSA algorithm, which uses the encryption key 315 as key. In the implementation form described here, the asymmetrical encryption method is not used as a classical public-key method but as a one-way encryption, since the method uses the encryption key 315 as a public key without providing another key as a private key for decoding.

Furthermore, the Object Code Generation Facility 650 encrypts an object identifier 420 in step 425 by a fourth encryption method. The fourth encryption method is an arbitrary known encryption method; for example a symmetrical encryption method, such as the Advanced Encryption Standard (in short: AES) or the Data Encryption Standard (in short: DES), is used here, which uses the system code that consists of the first part of the system code 215 and the second part of the system code 245, as key. The object identifier 420 contains in this implementation example preferably the product name, the production unit and/or the product specification or information of the exact contents of the product, which has to be provided with the object code. The result of step 425 is an encrypted object identifier 430.

In step 440, the encrypted system code 415 from step 410 and the encrypted object identifier 430 from step 425 are stored by the Third Data Memory Facility 660 in the data memory 120.

In step 125 shown in FIG. 1, the object code 405 is attached to the object, for which the object code 405 was created, by the Object Code Attachment Facility 670. The object was thereby manufactured by the production with the corresponding production unit number and provided with the corresponding object identifier 420. The object code 405 is attached to the object in such a manner that it is, for example, readable by a consumer and thus verifiable thereafter.

In another implementation example, the object code is divided into a first and a second part of the object code. The division as well as the character lengths of the first and the second part of the object code can be selected arbitrarily. In the implementation example preferred here, the first part of the object code represents two thirds and the second part of the object code one-third of the object code 405. When dividing the object code 405, as described in the example above, the first part of the object code is "F37E4A1B" and the second part of the object code is "D8AU". It is self-evident to the expert that other divisions, such as a quarter and three-quarters for the respective parts of the object code, are also possible.

It is therefore evident to the expert that the security of the method is achieved by decoding the object identifier 420 from the data memory 645, and the assignment of object code to object identifier is only possible if the used encryption method as well as the keys used for it are known, which, however, exist only as encrypted information in the data memories 625 and 645. Unencrypted information, consisting of the encryption key 315, the assignment identifier 330 and the second object-specific data 335, is available only in the data memory 635, which however by itself alone does not suffice to decode the encrypted information in the data memories 625 or 645 or to produce an assignment of object code to object identifier. Therefore, even with the knowledge of the information from one of the data memories 625, 635 or 645, it is not possible to restore all encrypted information, particularly the object identifier and the assignment of object code to object identifier.

Figure 5A:
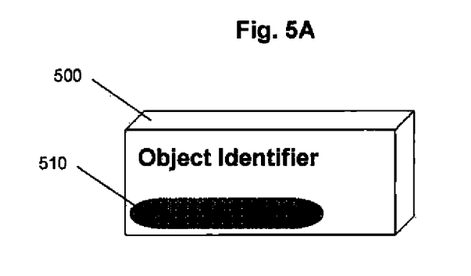
FIG. 5A shows an object with a first part of the object code attached on the outside under a visual protection and a second part of the object code not accessible from outside.
Figure 5B:
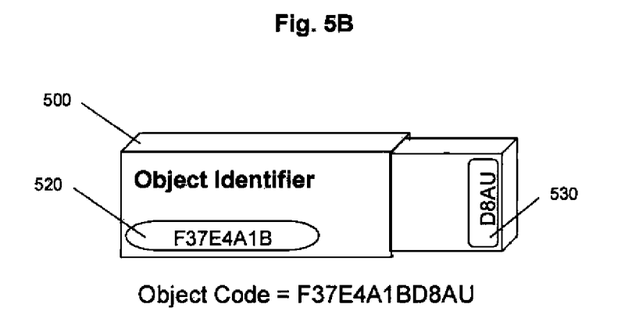
FIG. 5B shows the object as per FIG. 5A, in which the visual protection was removed from the first part of the object code and the second part of the object code is accessible by opening the object.

With reference to FIG. 5A and FIG. 5B, it will now be described how the object code 405 is attached to the object 500. The first part of the object code and the second part of the object code, which according to the implementation example described above have been created by dividing the object code 405, are attached in a preferred implementation example at different positions to the object 500. The first part of the object code 520 is thereby attached without being visible, accessible from outside, to the object 500 itself or on the packing of the object, in FIG. 5A. The second part of the object code 530 is attached, not accessible from outside, on the object 500, for example on the inside of the packing of the object or on the packed product. In the implementation example shown in FIG. 5A the first part of the object code 520 is attached under a visual protection 510, such as for example a scratch field, whereby the visual protection 510 must be destroyed in order to see the first part of the object code 520. Furthermore, as per FIG. 5B, the second part of the object code 530 is accessible if, for example, the packing of the object has been opened.

Figure 7:
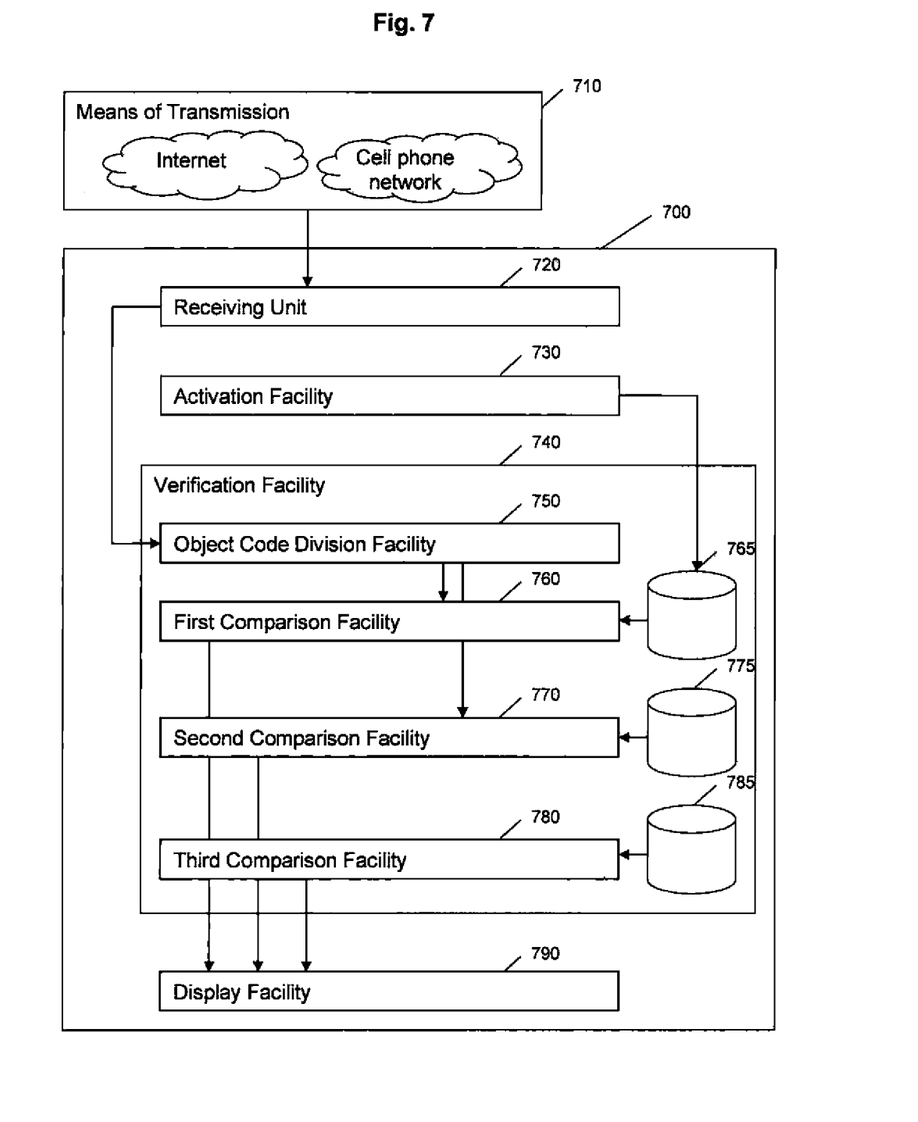
FIG. 7 shows a schematic representation of an implementation form of the device for verification of an object code.

A device for verifying an object code of an object is shown in an implementation example in FIG. 7. The device 700 contains a Receiving Unit 720, which receives the object code of the object, which is transmitted over a transmission medium 710, and transfers it to a Verification Facility 740, by which this object code is verified. The result of the verification is displayed by a Display Facility 790. The Verification Facility 740 comprises an Object Code Division Facility 750, which divides the object code and passes it on to a First Comparison Facility 760 and a Second Comparison Facility 770 for further processing. The First Comparison Facility 760 processes the transferred part of the object code and compares the result of this processing with data from a data memory 765, whereby the First Comparison Facility 760, on finding an entry in the data memory 765 matching the processed part of the object code, reads data from the data memory 765 which is assigned to the matching entry. The data read is kept available by the First Comparison Facility 760 in the Verification Facility 740 for further processing. The Second Comparison Facility 770 compares the transferred other part of the object code with data in a data memory 775 and, on finding a matching entry in the data memory 775, reads data assigned to this entry from the data memory 775. The data read is further processed by the Second Comparison Facility 770 and kept available in the Verification Facility 740. A Third Comparison Facility 780 takes over the data, which is kept available in the Verification Facility 740, and processes this data, whereby the processed data is compared with data which is stored in a data memory 785. On finding a matching entry in the data memory 785, the Third Comparison Facility 780 reads out data assigned to this entry and transfers it to the Display Facility 790 as the result of the verification of the object code.

In an implementation example, the data memory/memories 765, 775 and 785 is/are identical with the corresponding data memory/memories 625, 645 and 665 in FIG. 6. In another implementation example, in which the data memories in FIG. 7 and the data memories in FIG. 6 are not identical, at least the data stored in the data memories 765, 775, 785 of FIG. 7 is identical with the data stored in the corresponding data memories 625, 645 and 665 in FIG. 6. Furthermore, in an implementation example, the device 700 includes an Activation Facility 730, which stores activation information in the data memory 765.

Following below, an implementation form of the method for the verification of an object code is described with reference to FIG. 1. In FIG. 1 the data memories 765, 775 and 785 are shown as data memory 120 as a simplification. The object code, which was created with the method described above and which is attached to an object, is transferred in step 130 to the transmission medium 710 for verification. The transmission medium 710 transmits the object code to the Receiving Unit 720. The Receiving Unit 720 then transfers the received object code to the Verification Facility 740. The transmission medium 710 is either the Internet or a cell phone network. Both the Internet and the cell phone network are alternatively usable as a transmission medium 710 in a particularly preferred implementation example for the transfer of the object code to the Verification Facility 740. If the transmission medium 710 is the Internet, the Receiving Unit 720 is preferably a web page 560 and, if the transmission medium 710 is the cell phone network, it is a message 550, such as the state of the art known Short Message Service (SMS). The object code received by the Receiving Unit 720 is then transferred in step 135 to the Verification Facility 740 for verification.

In step 135 the object code is divided by the Object Code Division Facility 750 into at least a first part of the system code and an assignment identifier. In the example described here, in which the object code consists of 12 characters, where the first ten characters correspond to the first part of the system code and the last two characters the assignment identifier, the object code is divided into a first part of the system code with ten characters and an assignment identifier with two characters. As described above, the first part of the system code is then encrypted in the First Comparison Facility 760 by the selected first encryption method. Thereafter, this encrypted first part of the system code is compared with the encrypted first parts of the system codes, which are stored in the data memory 120. If a stored encrypted first part of the system code is found in the data memory 120, which matches the encrypted first part of the system code of the object code to be verified, the First Comparison Facility 760 reads the assigned data stored in the data memory 120. In the implementation example preferred here, this stored data comprises an encrypted second part of the system code and a first object-specific information. The encrypted second part of the system code is decoded to a second part of the system code by the First Comparison Facility 760 by using the second encryption method, which is identical with the symmetrical encryption method selected above, and with the first part of the system code as key. In an implementation example, the first part of the system code and the decoded second part of the system code are then combined together giving a system code. The first and second part of the system code, the first object-specific information and, as far as computed, the system code are kept available in the Verification Facility 740 for further use in other facilities of the Verification Facility 740. In addition, in an implementation example, the data read and/or a message indicating that a match was found in the data memory 120 is transferred to the Display Facility 790 for display. If the First Comparison Facility 760 does not find a matching encrypted first part of the system code in the data memory 120, then an error message 145 is transferred to the Display Facility 790, which indicates that no match could be found. In this case, the method is terminated and the Display Facility 790 displays the error message 145.

If the First Comparison Facility 760 found a matching encrypted first part of the system code in the data memory 120, the method continues with the transfer of the assignment identifier, obtained by dividing in the Object Code Division Facility 750, to the Second Comparison Facility 770. The Second Comparison Facility 770 compares the transferred assignment identifier with assignment identifiers stored in the data memory 120. If a matching assignment identifier is found in the data memory 120, the Second Comparison Facility 770 reads the data assigned to this assignment identifier, such as for example an encryption key and a second object-specific information, which is kept available for further processing in the Verification Facility 740. The data read and/or a suitable message, which says that data was found in the data memory 120 and is available for further processing in the Verification Facility 740, is/are transferred to the Display Facility 790 for display. If no matching assignment identifier could be found in the data memory 120, an appropriate error message 145 is sent to the Display Facility 790, which indicates that the assignment identifier was not found in the data memory 120 by the Second Comparison Facility 770. In this case the method is terminated and the Display Facility 790 displays the error message 145.

If the Second Comparison Facility 770 found a match in the data memory 120, the method continues with the Third Comparison Facility 780. The Third Comparison Facility 780, by using the third encryption method, encrypts the system code kept available in the Verification Facility 740, which is formed from the first and the second part of the system code, with the encryption key. The third encryption method is identical with the third encryption method described above. The system code thus encrypted is compared with encrypted system codes in the data memory 120. If a matching encrypted system code is found in the data memory 120, then the data assigned to this encrypted system code, here for example an encrypted object identifier here, is read by the Third Comparison Facility 780. The encrypted object identifier is decoded by using the fourth encryption method described above by the Third Comparison Facility 780 with the system code kept available in the Verification Facility 740 as key. The decoded object identifier and/or a suitable message that a matched encrypted system code was found in the data memory 120 is/are transferred to the Display Facility 790 to be displayed by the Display Facility 790. If no match is found in the data memory 120, an error message 145 is sent to the Display Facility 790, which indicates that the system code was not found in the data memory 120. In this case, the method is terminated and the Display Facility 790 displays the error message 145.

The Display Facility 790 displays the data and/or messages received from the first, second and third comparison facilities. For example in a preferred implementation example the error message 145 is displayed, which says that the transferred object code does not exist, which implies that there was a wrong entry of the object code or a counterfeit of the object. If the object code was found, i.e. the first system code was found in the data memory 120, the assignment identifier was found in the data memory 120 and matching data was found in the data memory 120, then the decoded object identifier 180 is displayed by the Display Facility 790.

Figure 5C:
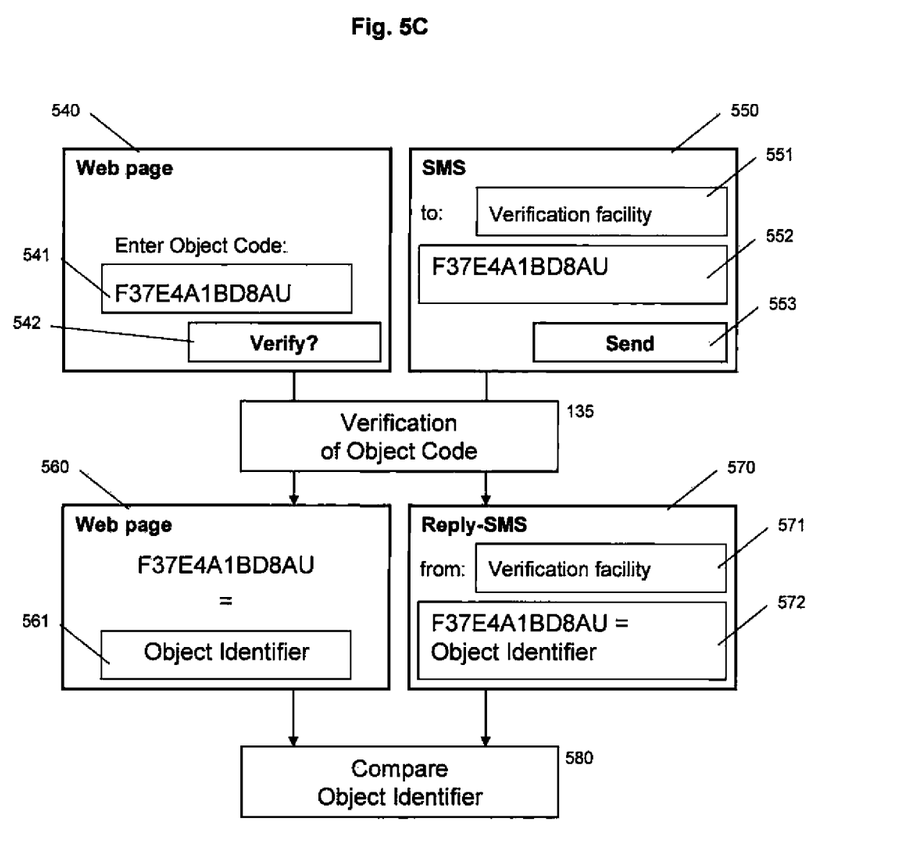
FIG. 5C shows a schematic flow of a verification of the object code of the object as per FIG. 5B by a consumer, using the method as per FIG. 1.

Following below, the verification of an object code by a consumer using the method described above is described with the FIGS. 5A, 5B and 5C. The consumer acquires, for example from a dealer, an object 500, which has an object code created using the method for identifying an object according to the invention on hand. The first part of the object code 520 "F37E4A1B" becomes visible by destroying the visual protection 510. The second part of the object code 530 "D8AU" becomes visible by opening the packing of the object 500. The consumer now combines the two parts of the object codes together to get the object code "F37E4A1BD8AU". This object code is transmitted by the consumer to the Verification Facility 740 by the transmission medium 710. In FIG. 5C a web page 540 is shown, which functions as a Receiving Unit 720, if the transmission medium 710 is the Internet. There is an entry field 541 on the web page 540, in which the consumer enters the object code. The transfer of the entered object code to the Verification Facility 740 is carried out by operating the function switch 542 provided on the web page 540. As described above, the Verification Facility 740 now verifies the transmitted object code in step 135. The result of the step 135 is transferred to the Display Facility 790. If the transmission medium 710 is the Internet, the Display Facility 790 displays the result preferably as a web page 560, in which the object identifier 561 for the verified object code is displayed. Furthermore the Display Facility 790 can also display the entered object code, for example for control purposes. If the step 135 is not executed successfully, then the Display Facility 790 displays the error message 145 on the web page 560, which says that the object code was not found. The consumer now compares in a step 580 whether the transmitted object identifier 561 matches the object identifier on the object 500. If these two object identifiers are the same, then the object is authentic according to the method.

According to another implementation example which is described now in reference to FIG. 5C, the consumer enters the object code of the object 500 in an SMS message 550, if the cell phone network is used as a transmission medium 710. The SMS message 550 contains the number 551 of the Verification Facility as well as the object code to be verified as message text 552. The SMS message 550 is transmitted to the Verification Facility 740 when the consumer presses the "send" button 553 on his/her device, such as a mobile telephone which uses the cell phone network. The Verification Facility 740 verifies the object code by executing the step 135. The result of the verification is sent by a reply-SMS 570 to the device of the consumer over the cell phone network. In the case of a successful verification the reply-SMS contains as reply text 572, for example, the object code for control purposes and the object identifier. In the case of an unsuccessful verification the reply text 572 contains the message 145. The consumer now compares in a step 580 the transmitted object identifier in the reply text 572 with the object identifier on the object 500. If these two object identifiers are the same, the object is authentic according to the method.

According to a preferred implementation example, as shown in FIG. 5C, the Display Facility 790 displays the object identifier as a web page 580, if the transmission medium is the Internet and, if the transmission medium is a cell phone network, as a reply message 570. The displayed object identifier can be now compared with the object identifier attached on the object, in order to determine the authenticity of the object. The object is authenticated if the displayed object identifier and the attached object identifier are identical.

In a preferred implementation example of the method as per FIG. 1, the system code is provided with activation information in the data memory 120 which indicates whether the object code is activated. After the verification of the object code in step 135 it is additionally checked in step 160 whether the verified object code is also released for verification. The query of a deactivated object code leads to a corresponding message 165 in the Display Facility 790. If it is found in the verification in step 160 that the object code is released for verification, then this is transferred to the Display Facility 790 for display 150.

The object code is preferably set to "deactivated" by default during the generation of the first part of the system code in step 110, and so also of the system code as well as the object code. The system code is activated by a step 155, which has to be executed in step 135 before a verification. The object code is activated by entering the first part of the system code in the Activation Facility 730 only if a matching first part of the system code, which is not activated yet, is found in the data memory 765. If a matching non-activated first part of the system code is found, then the activation information for the first part of the system code is activated and the object code is thus released for verification. Furthermore a suitable message, that the object code was activated, is sent to the Display Facility 790. Otherwise a corresponding message is displayed by the Display Facility 790, which indicates that the entered first part of the system code is not available in the data memory 765 or that although the entered first part of the system code was found in the data memory 765, it is already activated.

In other implementation examples of the method as per FIG. 1, query-specific data is stored in another data memory which is not shown. This query-specific data comprises, in the case of transmission of the object code over the Internet, preferably the time when the object code was transmitted, the IP-address which gives the origin of transmission, the Internet service provider and the number of entry attempts. If a cell phone network is used as a transmission facility 710, the query-specific data comprises preferably the time, the cell phone number of the querying person and the SMS dialing number. The SMS dialing number is, for example, a so-called SMS abbreviated dialing number. However, the SMS dialing number can also be a corresponding SMS long dialing number in the case of some cell phone networks. Other formats of SMS dialing number are possible depending on the cell phone network. It is self-evident to the expert that further query-specific data can be stored and that the mentioned additional data memory is also identical with the data memories described above.

Other preferred implementation examples of the invention on hand include, during verification of a transferred object code, a query of the query-specific data, in order to determine whether the object code was already queried. In these implementation examples, a query identifier and a query keyword are generated in addition during the first query of the object code, and stored as query-specific data in a query data memory which is not shown. The query identifier and the query keyword are shown, for example, via the Display Facility 790 to the consumer, who verifies a certain object code for the first time, i.e. the object code has not been queried or verified yet. In further query attempts of this object code, which has been queried once already, the query identifier and the query keyword are transmitted in addition by the consumer, in order to ensure that only the consumer who has queried the object code for the first time can carry out further successful queries for this object code. Other consumers, who do not have the corresponding query identifier and the query keyword for this object code, can either not query the object code successfully or they receive a corresponding message that the object code has already been verified for the first time.

The method according to the invention is executed preferably as a computer program on a computer and controls it. The computer includes various data processing facilities including single-user PCs, client-server architectures or other networked computer systems, insofar as they are set up accordingly and are suitable for the implementation of the method.

The invention claimed is:

1. A method for identifying an object, comprising at least one object identifier, with an object code that is used to verify the authenticity of the object, comprising:

generating a unique random system code, which consists of a first and a second part of the system code, in which the first part of the system code is created from a first character set by a first random method that randomly selects a number of characters from the first character set and the second part of the system code from a second character set by a second random method that randomly selects a number of characters from the second character set, and storing the system code together with at least a first object-specific information in a first data memory, in which the first part of the system code is encrypted by a first encryption method and the second part of the system code by a symmetric encryption method, which uses the first part of the system code as a key for the symmetric encryption;

generating a random encryption key from a third character set by a third random method of a unique assignment identifier by an assignment method and storing the encryption key, the assignment identifier and at least a second object-specific information in a second data memory;

generating an object code, which consists of at least the first part of the system code and the assignment identifier encrypting the system code by a third encryption method, which uses the encryption key as a key, encrypting of the object identifier by a fourth encryption method which uses the system code as a key, and storing the encrypted system code together with the encrypted object identifier in a third data memory;

attaching the object code to the object, wherein the method provides a fourth data memory, in which query-specific data created during verification of the authenticity of the object is stored.

2. The method according to claim 1 further comprising storing an activation information, which indicates whether the system code is active or non-active, in the first data memory.

3. The method according to claim 1 further comprising dividing the object code into a first part of the object code and a second part of the object code.

4. The method according to claim 3 further comprising attaching the second part of the object code to the object in such a manner that it is not accessible from the outside, and attaching the first part of the object code to the object on the outside.

5. The method according to claim 4, wherein the first part of the object code is attached under a visual protection.

6. The method of claim 1, further comprising a method for verifying the authenticity of an object with the object code comprising at least one object identifier comprising:

transmitting the object code through a transmission medium, receiving the transmitted object code by a Verification Facility and storing the query-specific data, which is generated during the verification of the authenticity of the object code, in a fourth data memory;

dividing the object code into at least a first part of the system code and an assignment identifier;

encrypting the first part of the system code with a first encryption method comparing the encrypted first part of the system code with the first parts of the system codes stored in the first data memory and, if the encrypted first part of the system code is found in the first data memory, decoding a second part of the system code stored in the first data memory by a second encryption method, which uses the first part of the system code as a key and concatenation of the first and the second parts of the system code to form the system code;

comparing the assignment identifier with assignment identifiers which are stored in the second data memory and, if a matching assignment identifier is found, encrypting the system code by a third encryption method. which uses an encryption key, which is stored together with the assignment identifier in the second data memory, as a key;

comparing the encrypted system code with encrypted system codes which are stored in the third data memory and, if a matching encrypted system code is found, decoding an assigned encrypted object identifier by a fourth encryption method. which uses the system code as a key; and displaying a decoded object identifier for comparing the displayed object identifier with the object identifier on the object.

7. The method according to claim 6, in which the system code is stored in the first data memory with additional activation information, which shows whether the system code is active or non-active, whereby the method has a further step in which the activation information is activated by one of the system codes.

8. The method according to claim 6, whereby the transmission medium is the Internet or a cell phone network.

9. The method according to claim 6, in which the query-specific data, on entering the code via the Internet, comprises at least a time, an IPaddress, an Internet service provider and a number of entry attempts.

10. The method according to claim 6, in which the query-specific data, on entering the code via Short Message Service (SMS), comprises at least a time, a cell phone number and an SMS dialing number.

11. The method of claim 1, wherein the first encryption method is cryptographic hash function.

12. The method of claim 11, wherein the cryptographic hash function is one of a message digest algorithm and a secure hash algorithm.

13. The method of claim 1, wherein the symmetric encryption is one of an advanced encryption standard (AES) and a data encryption standard (DES).

14. A device for identifying an object with an object code, comprising at least one object identifier, which is used for the verification of the authenticity of the object; comprising:

a System Code Creation circuit that creates a unique random system code, which consists of a first and a second part of the system code, wherein the first part of the system code is created from a first character set by a first random method that randomly selects a number of characters from the first character set and the second part of the system code is created from a second character set by a second random method that randomly selects a number of characters from the second character set;

a First Data Memory circuit that stores the system code created by the System Code Creation circuit together with at least a first object-specific information, wherein, before storing, the first part of the system code is encrypted by a first encryption method and the second part of the system code is encrypted by a symmetric encryption method, which uses the first part of the system code as a key for the symmetric encryption;

an Encryption Key Creation circuit that creates a random encryption key from a third character set by a third random method and a unique assignment identifier by an assignment method;

a Second Data Memory circuit that stores the created encryption key, the assignment identifier and at least a second object-specific information;

an Object Code Creation circuit that creates an object code, which consists of at least the first part of the system code and the assignment identifier;

a Third Data Memory circuit that stores the system code encrypted by a third encryption method, which uses the encryption key as a key, together with the object identifier, which is encrypted by a fourth encryption method which uses the system code as a key;

an Object Code Attachment circuit that attaches the object code to the object; and a fourth Data Memory circuit that stores query-specific data, which is generated during the verification of the authenticity of the object.

15. The device according to claim 14, further comprising:
a Dividing circuit that divides the object code into a first and a second part of the object code.

16. The device for verifying the authenticity of an object with an object code comprising at least one object identifier, wherein the object code was created by a device according to claim 14, comprising:

a Receiving circuit that receives the object code, which is transferred through at least one transmission medium;

a Verification circuit that decodes the object code entered into the entry facility and to enable the decoding of the entered object code, comprising:

an Object Code Division circuit that divides the entered object code into at least a first part of the system code and an assignment identifier;

a First Comparison circuit that encrypts the first part of the system code by a first encryption method and to compare the encrypted first part of the system code with the first parts of the system codes stored in the First Data Memory circuit, and, if the encrypted first part of the system code is found in the First Data Memory circuit, to decode a second part of the system code stored in the First Data Memory circuit by a second encryption method, which uses the first part of the system code as key and to combine the first and the second parts of the system code together to form the system code;

a Second Comparison circuit that compares the assignment identifier with assignment identifiers which are stored in the Second Data Memory circuit and, if a matching assignment identifier is found, to encrypt the system code by a third encryption method, which uses an encryption key stored together with the assignment identifier in the second data memory as a key;

a Third Comparison circuit that compares the encrypted system code with encrypted system codes stored in the Third Data Memory circuit and, if a matching encrypted system code is found, to decode an assigned, encrypted object identifier by a fourth encryption method which uses the first part of the system code as key; a Display circuit that displays the object identifier decoded by the Verification circuit; and a fourth Data Memory circuit that stores query-specific data which is generated during the verification of the authenticity of the object code.

17. The device according to claim 16, further comprising an Activation circuit that activates a system code stored in the First Data Memory circuit as non-active.

18. The device according to claim 16, wherein the transmission medium is the Internet or a cell phone network.

19. The device according to claim 18 wherein, on entering the object code via the Internet, the fourth Data Memory circuit stores at least a time, an IP address, an Internet service provider and a number of entry attempts.

20. The device according to claim 18 wherein, on entering the object code via Short Message Service (SMS), the fourth Data Memory circuit stores at least the a time, a cell phone number and an SMS dialing number.

21. The device of claim 14, wherein the first encryption method is cryptographic hash function.

22. The device of claim 21, wherein the cryptographic hash function is one of a message digest algorithm and a secure hash algorithm.

23. The device of claim 14, wherein the symmetric encryption is one of an advanced encryption standard (AES) and a data encryption standard (DES).

24. A computer program on a non-transitory computer readable medium that, when running on a computer, executes the method according to claim 1.

25. A non-transitory data carrier on which a computer program according to claim 24 is stored in a machine-readable form.

* * * * *